(12) United States Patent
Saga et al.

(10) Patent No.: US 7,054,234 B2
(45) Date of Patent: May 30, 2006

(54) NEAR-FIELD HIGH DENSITY MAGNETO-OPTICAL RECORDING HEAD

(75) Inventors: Hideki Saga, Fuchu (JP); Takuya Matsumoto, Hachioji (JP)

(73) Assignee: Hitachi, Ltd., Tokyo (JP)

( * ) Notice: Subject to any disclaimer, the term of this patent is extended or adjusted under 35 U.S.C. 154(b) by 478 days.

(21) Appl. No.: 10/354,063

(22) Filed: Jan. 30, 2003

(65) Prior Publication Data
US 2003/0223316 A1    Dec. 4, 2003

(30) Foreign Application Priority Data
Jun. 3, 2002    (JP)    ............................. P2002-160906

(51) Int. Cl.
*G11B 11/00*    (2006.01)
(52) U.S. Cl. .................. 369/13.33; 369/13.13
(58) Field of Classification Search ............. 369/13.33, 369/13.13
See application file for complete search history.

(56) References Cited

U.S. PATENT DOCUMENTS

| | | | | |
|---|---|---|---|---|
| 5,696,372 A * | 12/1997 | Grober et al. | ............... | 250/216 |
| 6,649,894 B1 * | 11/2003 | Matsumoto et al. | ..... | 250/201.3 |
| 6,714,370 B1 * | 3/2004 | McDaniel et al. | ........ | 369/13.33 |
| 6,768,556 B1 * | 7/2004 | Matsumoto et al. | ........ | 356/601 |
| 6,795,380 B1 * | 9/2004 | Akiyama et al. | ......... | 369/13.33 |
| 6,949,732 B1 * | 9/2005 | Kiguchi et al. | ............. | 250/216 |
| 2003/0185108 A1 * | 10/2003 | Song et al. | .............. | 369/13.33 |
| 2005/0047283 A1 * | 3/2005 | Ruigrok | ................... | 369/13.33 |

FOREIGN PATENT DOCUMENTS

| | | |
|---|---|---|
| JP | 2665022 | 6/1990 |
| JP | 10-21598 | 7/1996 |
| JP | 11-126385 | 10/1997 |
| JP | 2000-353301 | 6/1999 |
| WO | WO 00/14733 | 9/1998 |
| WO | WO 01/67443 A1 | 3/2000 |

* cited by examiner

*Primary Examiner*—Tan Dinh
(74) *Attorney, Agent, or Firm*—Reed Smith LLP; Stanley P. Fisher, Esq.; Juan Carlos A. Marquez, Esq.

(57) ABSTRACT

A recording head for decreasing recording noise accompanying malformation of a recorded mark and to form the recorded mark capable of increasing reproduction resolution at the time of magnetic reproduction. The head has a light source and a scatterer for recording information on a recording medium by generating near-field light by application of light from the light source and forming a magnetic domain array on the recording medium, a perimeter of the scatterer defines a plurality of vertices and a distance between a first vertex and a last vertex is shorter than the width of the recording track on the recording medium. The recording head improves recording density and can be used to manufacture a highly reliable information recording and reproducing apparatus having a reduced cost per capacity.

16 Claims, 8 Drawing Sheets

FIG. 5A

SHAPE OF METAL SCATTERER
NUMERALS ARE IN THE UNITS OF NM
NUMERALS INDICATE RADII OF CURVATURE

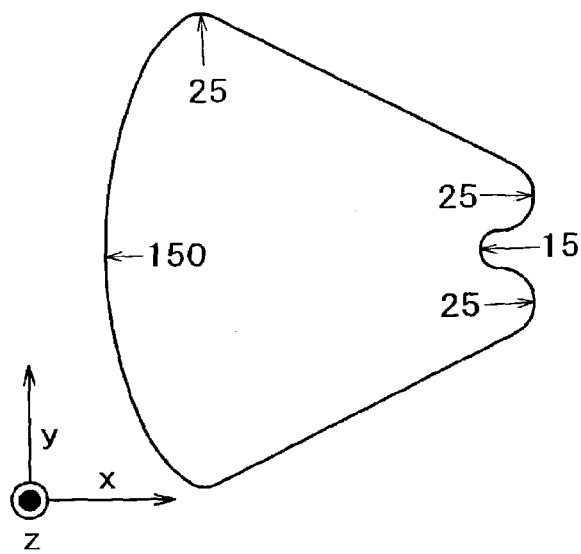

FIG. 5B

NEAR-FIELD LIGHT DISTRIBUTION
SOLID LINES ARE ISOINTENSITY LINES
DASHED LINE REPRESENTS A FRINGE SHAPE OF METAL SCATTERER
NUMERALS INDICATE INTENSITY RATIO OF THE NEAR-FIELD LIGHT TO INCIDENT LIGHT

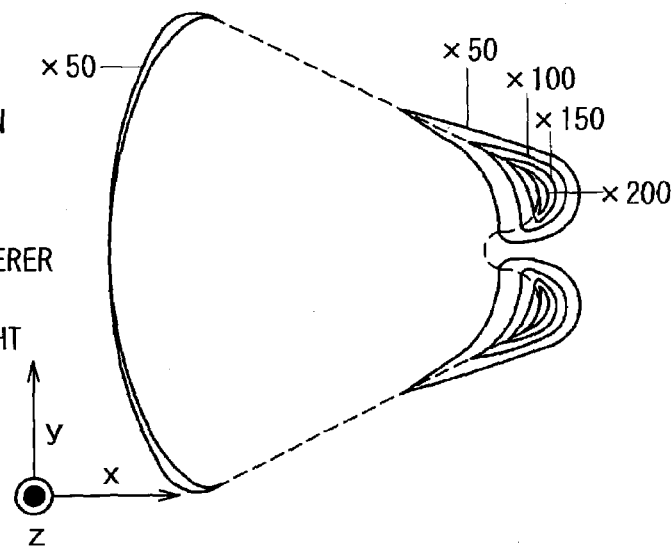

FIG. 5C

RECORDING-FILM TEMPERATURE DISTRIBUTION
SOLID LINES ARE ISOTHERMAL LINES
DASHED LINE REPRESENTS A FRINGE SHAPE OF METAL SCATTERER
NUMERALS INDICATE TEMPERATURE RISES IN THE SURFACE OF TbFeCo RECORDING FILM

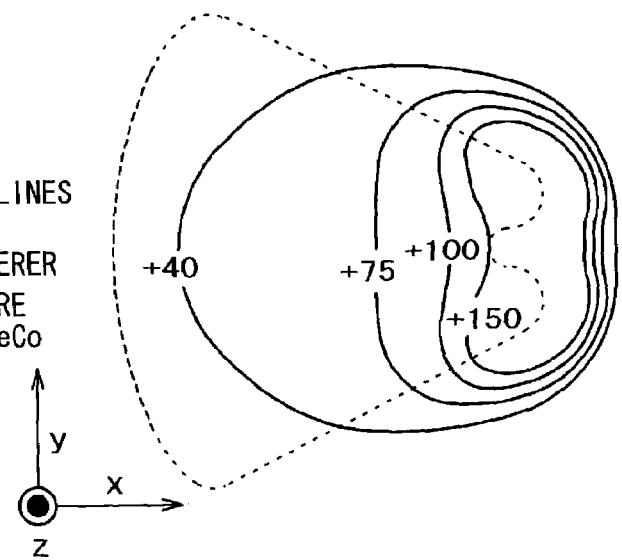

NEAR-FIELD HIGH DENSITY MAGNETO-OPTICAL RECORDING HEAD

BACKGROUND OF THE INVENTION

1. Field of the Invention

The present invention relates to a method for recording information in which the recording medium is excited optically or thermally and physical properties of the recording medium are changed locally, a method for reproducing the information, an information recording head having a function of recording, an information recording and reproducing head having functions of recording and reproducing, and an information recording and reproducing apparatus having any of the above-listed properties and/or functions.

2. Description of the Related Art

In "the conventional information recording medium on which both magneto-optical reproducing and magnetic reproducing can be performed and the conventional recording and reproducing apparatus for the same" (a first conventional technology) that is disclosed by JP-A No. 21598/1998, recording is performed by irradiating a magneto-optical recording film formed on the recording medium with recording light through a substrate to heat the recording film and form reversed magnetic domains therein. Further, reproduction of the information is performed by irradiating the aforesaid magneto-optical recording film with the recording light from a light source through the substrate and detecting rotation of a polarization plane of reflected light and by forming a second magnetic layer on the magneto-optical recording film and reproducing leakage flux from this second magnetic layer.

Further, "a magnetic head and a manufacturing method of the same" (a second conventional technology) is described in Japanese Patent No. 2665022 which discloses a method in which a magnetoresistance effect element, whose recording sensitivity distribution is curved, is used to accommodate an approximately crescentic recorded magnetic domain formed by light pulse magnetic-field modulation recording etc.

Moreover, "an information recording and reproducing apparatus" (a third conventional technology) is described in JP-A No. 353301/2000 which discloses an information recording and reproducing apparatus that uses a recording medium in which information is stored through the use of a recorded magnetic domain on a perpendicular magnetic recording film formed on the surface of a substrate member. Such substrate member has a rugged structure on the surface, wherein a center of a track is placed on a land, the magnetic domain whose width in a direction perpendicular to the track is not less than a land width is formed, hence improving recording density.

Furthermore, "a magneto-optical recording medium, a manufacturing method for the same, and a magneto-optical recording and reproducing apparatus" (a fourth conventional technology) is taught by JP-A, No. 126385/1999 which describes that a domain wall formed in a magnetic layer by a magnetic-field modulation recording method is formed in the shape of a circular arc that extends along a rear part of an isothermal line for the Curie temperature of a magnetic material and the shape of a magnetized region becomes crescent.

FIG. 7 is a view illustrating a recording process in detail where the recording is performed on the perpendicular magnetic recording film by a prior-art light pulse magnetic-field modulation recording method with a recording and reproducing head that uses a conventional single-peaked light spot, i.e., a light spot that is focused to a diffraction limit with a lens. The light pulse magnetic-field modulation recording method is a well-known recording method using the light pulse magnetic-field modulation recording that is a kind of thermomagnetic recording. Since in the light pulse magnetic-field modulation recording, the size of the recorded magnetic domain (spacing of domain walls in a scanning direction) is less prone to be limited by the size of a region of the magnetic medium excited by a light spot, as will be explained below, it is an advantageous method especially in forming a minute recorded magnetic domain. Note that in the explanation in this description, formation of the recorded magnetic domain by the light pulse magnetic-field modulation recording is taken as an example to explain the present invention, but it is not intended to limit the recording method to be used for the invention to the light pulse magnetic-field modulation recording method. The present invention is also effective in other thermomagnetic recording methods such as the DC magneto-optical magnetic-field modulation method and the light modulation recording method.

Referring to FIG. 7, the recording data 700 is given at the time of recording. The recording data 700 generates a recording bias magnetic field 702 in the vicinity of a heating position by the light spot on the recording film. This recording bias magnetic field 702 is applied normal to the recording film. Simultaneously, as shown by the diagram of laser emission intensity 701, the light source is driven in a pulsed manner in synchronization with a minimum change unit (detection window width) of a recorded magnetic domain length along the recording track and is applied on the recording film. In the region heated by the light irradiation, coercive force of the recording film is reduced to lower than an absolute value of the recording bias magnetic field 702, and magnetization of the region follows a direction of the recording bias magnetic field 702; thus one shot of light pulse irradiation determines a magnetization direction in an approximately circular region as shown by the diagram of a recorded magnetic domain 703. With the light spot scanning over the recording film, the center of the heated region is moved at certain intervals, and consequently the recording film is heated for that region and cooled intermittently. If the interval of the light pulse irradiation is being shortened, the approximately circular regions come to overlap each other partially, and the recording is performed as if a crescentic recorded magnetic domain were formed by each shot of the light pulse irradiation. The diagram of the recorded magnetic domain 703 in FIG. 7 shows schematically the shape of this recorded magnetic domain, as viewed from directly above the recording film, that is formed on the recording film when performing a recording operation as illustrated by the diagrams of the laser emission intensity 701 and the recording bias magnetic field 702. In FIG. 7, the light spot is scanned from the left to the right. When the recording bias magnetic field is positive, formed is a magnetic domain whose magnetization directs upwards off the sheet of the drawing (meshed domain); when the recording bias magnetic field is negative, formed is a magnetic domain whose magnetization directs downwards off the sheet of the drawing (colorless domain).

It is generally understood that in the case where thermomagnetic recording is performed by use of a light spot focused to a diffraction limit with a lens, a method employing the light pulse magnetic-field modulation recording is advantageous because a recording power margin can be secured to a large degree. In this light pulse magnetic-field modulation recording, if an approximately circular light pulse of a single peak focused to a diffraction limit with a lens is used, since the magnetization direction of the approximately circular region is determined in each single shot of light pulse irradiation, the recorded magnetic domain becomes crescent consequently. However, in the case where the crescent magnetic domain is reproduced by use of normal magnetic-flux detecting means (i.e., GMR element) that has a linear sensitivity distribution, there exist a problem that reproducing resolution decreases. This is because the time when the magnetic-flux detecting means passes over the domain wall differs depending on the distance from the center of the track and hence the response waveform from the recorded magnetic domain is enlarged. Moreover, in the top of the crescentic recorded magnetic domain, the domain walls become close to each other. See FIG. 11 of JP-A, No. 126385/1999 described above. Formation of the magnetic wall, therefore, becomes unstable, and an unexpected domain wall shape is likely to develop. Since a response from this portion is a noise (recording, noise) that is different from user data originally recorded, it becomes a hindrance against normal reproducing of the user data. Thus, with the first or fourth conventional technology, the recording density could not be fully improved due to problems of the resolution of the reproduced signal and the noise, and as a result it was disadvantageous in several respects: increased size of the information recording and reproducing apparatus, increased manufacturing costs of the information recording and reproducing apparatus, and poor reliability, etc.

Further, with respect to the second conventional technology, since considerable decrease in the resolution occurs when the center of the magnetoresistance effect element offsets from the center of the recorded magnetic domain sequence, it has become necessary to control track offset between the recording time and the reproducing time to an extremely small value. Moreover, it was difficult to form the magnetoresistance effect element that has a curved sensitivity distribution and, consequently, it was very disadvantageous in respect of the manufacturing cost of such an information recording and reproducing apparatus.

Further, with respect to the third conventional technology, the process of manufacturing the medium becomes complicated because the rugged structure is formed on the surface of the substrate member of the recording medium. Hence, it was disadvantageous in respect of the cost of the information recording medium. Moreover, in the case where the recording and reproducing head is made to be afloat at a position very close to the surface of the recording medium using dynamic pressure, air film rigidity between the recording medium and the head slider decreases and crash of the slider is likely to occur. Accordingly, such third conventional technology was disadvantageous in respect of the reliability of the information recording and reproducing apparatus.

Referring to FIG. 7, in a point area of the crescentic magnetic domain, the domain walls are in very close vicinity to each other and become unstable, and accordingly the unexpected domain wall shape that does not reflect a heat distribution at the time of recording is likely to develop. When the information is reproduced from the recorded domain walls, the response from a portion of such an unexpected domain wall shape will become a noise different from the originally recorded information (recording noise) which is a hindrance to the normal reproduction of the user data. The diagram of a GMR reproduced signal 704 shows a reproduced signal waveform obtained when the recorded magnetic domain 703 is reproduced using a magnetic detection device such as a normal GMR element. When the recorded magnetic domain like the recorded magnetic domain 703 is reproduced in such manner, since the domain wall is curved on the whole, a track center region and track edge regions contribute to the reproduced signal with different phases, respectively, which gives rise to a problem that the resolution of the reproduced signal is decreased.

SUMMARY OF THE INVENTION

According to at least one preferred embodiment, the present invention provides an information recording and reproducing head comprising: a slider for scanning the surface of a recording medium; a light source that is installed on the slider and supplies recording energy; and a scatterer that is formed in the vicinity of the surface of the slider so as to oppose the recording medium and that receives irradiation of the light from the light source, causes local physical properties to change by exciting the recording medium optically or thermally, and thereby records information therein, wherein a fringe part or perimeter of the scatterer, that generates intense near-field light capable of causing the physical properties to change in the recording medium, comprises at least two adjacent vertices and the distance between the vertices is shorter than the recording track width on the recording medium.

In another preferred aspect, the information recording and reproducing head of the present invention comprises: a slider for scanning the surface of a recording medium; a light source that is installed on the slider and supplies recording energy; a scatterer that is formed in the vicinity of the surface of the slider so as to oppose the recording medium and that receives irradiation of light from the light source, causes local magnetic properties to change by exciting the recording medium optically or thermally, and thereby records information; and a magnetic flux detecting element that is installed on the slider and detects leakage flux from the surface of the recording medium locally; wherein a perimeter of the scatterer, at which the intense near-field light for causing the physical properties to change in the recording medium is generated, comprises at least two adjacent vertices where the distance between the vertices is shorter than the recording track width on the recording medium.

Another preferred aspect of the present invention resides in an information recording and reproducing apparatus that uses a recording medium storing information by means of a local change in the physical properties caused by optical or thermal excitation, wherein the apparatus comprises: a recording and reproducing head; recording-signal processing means that drives the light source according to a transformed result obtained by performing predetermined transformation on the user data and thereby forms a magnetic domain array corresponding to the user data on the recording medium; reproduced-signal processing means that performs inverse transformation that is inverse to the transformation on a signal from the magnetic-flux detecting means and thereby restores the user data; and a scanning mechanism for placing the slider in an arbitrary position of the recording medium.

Another aspect of the present invention resides in a method for recording information comprising the steps of:

encoding user data to obtain recording data;

sending the recording data to a recording-coil drive circuit via a recording-waveform generation circuit, and generating a recording bias magnetic field in the vicinity of a heating region on an information recording medium using intense near-field light from a scatterer disposed between a semiconductor laser and said information recording medium;

applying the recording bias magnetic field perpendicular to the recording medium, and simultaneously driving, via a laser drive circuit, said semiconductor laser in a pulsed manner in synchronization with minimum change units of a recorded magnetic domain length along a recording track;

reducing the coercive force of the recording medium to lower than an absolute value of the recording bias magnetic field in the region heated by the near field light so that the magnetization of the region follows a direction of the recording bias magnetic field whereby one shot of a light pulse irradiation determines a magnetization direction in said region having an approximately rectangular shape;

moving the center of the heated region at predetermined intervals by moving the scatterer over the recording track so that a plurality of said regions in the recording medium are heated and cooled intermittently; and shortening the interval of the light pulse irradiation so that the approximately rectangular regions partially overlap each other to form an elongated, approximately rectangular recorded magnetic domain.

At the time of reproducing the information, a GMR element is made to scan over the medium on which the information was recorded by the preferred method, and the reproduced signal is obtained. The reproduced signal reflects the recording data obtained by transformation of the user data in the encoder, and is restored to the user data after being subjected to such processing as amplification, equalization, binary conversion, decoding, etc., if needed.

By the foregoing method, even when the light pulse magnetic-field modulation recording that is advantageous especially for high linear-density recording is used, increase in the recording noise accompanied by malformation of a minute magnetic domain structure can be suppressed. In addition, the bend of the domain wall of the recorded magnetic domain near the recording track center region is reduced, and decrease in the reproducing resolution at the time of magnetic reproducing resulting from the bend can be suppressed. For this reason, it becomes unnecessary to use the magnetic-flux detecting means that is hard to manufacture or the like and to control the allowable amount of track offset between the recording time and the reproducing time to an extremely small value. At the same time, it becomes possible to improve the recording density. The preferred method of the present invention becomes extremely advantageous in several respects: the size of the information recording and reproducing apparatus, the manufacturing cost of the information recording and reproducing apparatus, the reliability, etc.

Other and further objects, features and advantages of the invention will appear more fully from the following description.

BRIEF DESCRIPTION OF THE DRAWINGS

For the present invention to be clearly understood and readily practiced, the present invention will be described in conjunction with the following figures, wherein like reference characters designate the same or similar elements, which figures are incorporated into and constitute a part of the specification, wherein:

FIG. 5A is a view illustrating a preferred shape of the metal scatterer;

FIG. 5B is a view illustrating the near-field light generated by the metal scatterer of FIG. 5A;

FIG. 5C is a view illustrating how the recording medium is heated in a preferred recording and reproducing head according to the present invention;

DETAILED DESCRIPTION OF THE INVENTION

It is to be understood that the figures and descriptions of the present invention have been simplified to illustrate elements that are relevant for a clear understanding of the present invention, while eliminating, for purposes of clarity, other elements that may be well known. Those of ordinary skill in the art will recognize that other elements are desirable and/or required in order to implement the present invention. However, because such elements are well known in the art, and because they do not facilitate a better understanding of the present invention, a discussion of such elements is not provided herein. The detailed description of the present invention and the preferred embodiment(s) thereof is set forth in detail below with reference to the attached drawings.

Figure 1:
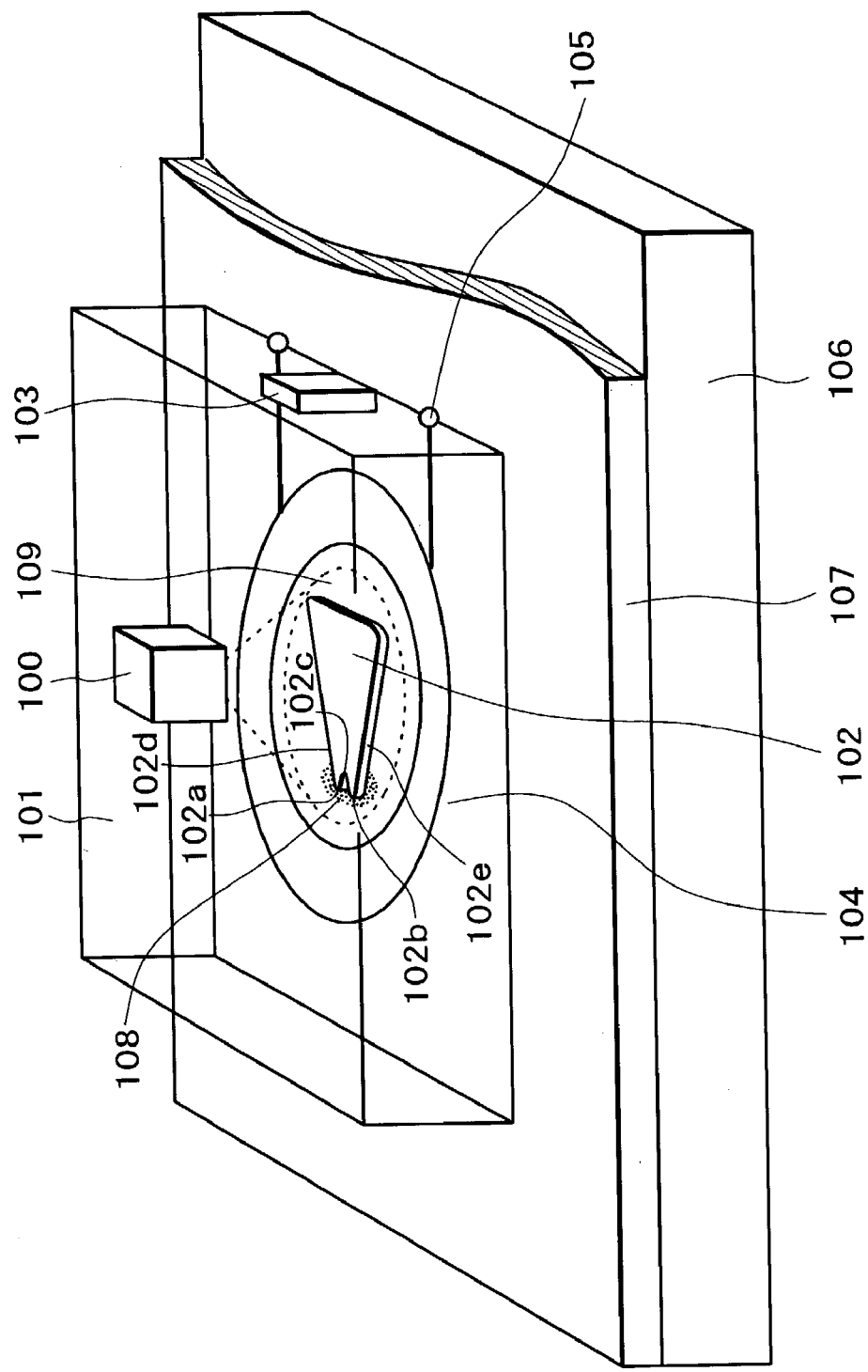
FIG. 1 is a view showing an example of a construction of a preferred recording and reproducing head according to the present invention.

FIG. 1 is a view showing an example of the construction of the recording and reproducing head according to the present invention. A semiconductor laser 100 acting as a recording light source is installed on the top face (i.e., the face opposite to a face directly opposing the recording medium) of a slider 101 for scanning the surface of the recording medium comprising a substrate 106 and a recording film 107 formed on the substrate 106 with a predetermined distance between the top surface of the recording film 107 and the bottom surface of the slider 101. The oscillation light wavelength of the semiconductor laser 100 is 785 nm. Laser beam 109 emitted from this semiconductor laser is applied on a metal scatterer 102 formed on the slider bottom (a face opposing the recording film). When the metal scatterer 102 receives irradiation of light, plasmons are excited in it and consequently intense near-field light 108 is generated in the vicinity of the metal scatterer 102. The metal scatterer 102 is an Au thin film of a thickness of 20 nm, is in the shape of a pentagon as viewed from the semiconductor laser 100 side, and comprises two convex vertices 102a, 102b and a concave vertex 102c. The angle, $\alpha$, that is formed by two equal-length sides 102d, 102e of the metal scatterer 102, as viewed from the semiconductor laser side, preferably is set to 30 degrees and the lengths of the two sides 102d, 102e preferably are set to 200 nm. The portion of the metal scatterer 102 where the intense near-field light 108 is generated for exciting the recording film 107 optically or thermally comprises the three adjacent vertices 102a, 102b and 102c where the concave vertex 102c preferably is arranged between the two convex vertices 102a, 102b. The radii of curvature of the vertices 102a, 102b and 102c preferably are set to about 20 nm. Note that in this description, the "vertex" indicates "a part corresponding to a region where the radius of curvature of the fringe (or perimeter) of the scatterer 102 is small as compared with those of adjacent parts in a projected figure obtained by projecting the shape of the scatterer 102 on a plane perpendicular to a traveling direction of the light from the light source," and the "side" indicates "a portion corresponding to a continuous region where the radius of curvature of the fringe is large as compared with those of adjacent regions in the projected figure obtained by projecting the shape of the scatterer on a plane perpendicular to the traveling direction of the light from the light source." Incidentally, in FIGS. 1–4, in order to show an internal structure of the recording and reproducing head more clearly, part of depiction of the front of slider's backside is omitted. On the bottom of the slider 101, a recording coil 104 comprising Cu wiring is formed so as to surround the metal scatterer 102. This recording coil. 104 is used to generate a recording bias magnetic field that is necessary to perform thermomagnetic recording on the recording medium in a direction perpendicular to the surface of the recording medium. A recording coil electrode 105 is a pull-out terminal for injecting a driving current in the recording coil 104. Further, on the side of the slider 101, a GMR element 103 that is the magnetic flux detecting element is provided.

Although only some examples of the construction of the recording and reproducing head wherein the semiconductor laser acting as the recording light source is mounted directly on the slider, are shown in this application, the light source can be disposed not only on/in the slider, but at an outside of the slider. And the laser light emitted from the light source can be guided from by means such as an optical fiber or an optical waveguide, etc., and applied on the metal scatterer. The disposition explained above can be applicable to all of the construction shown in this application.

Figure 2:
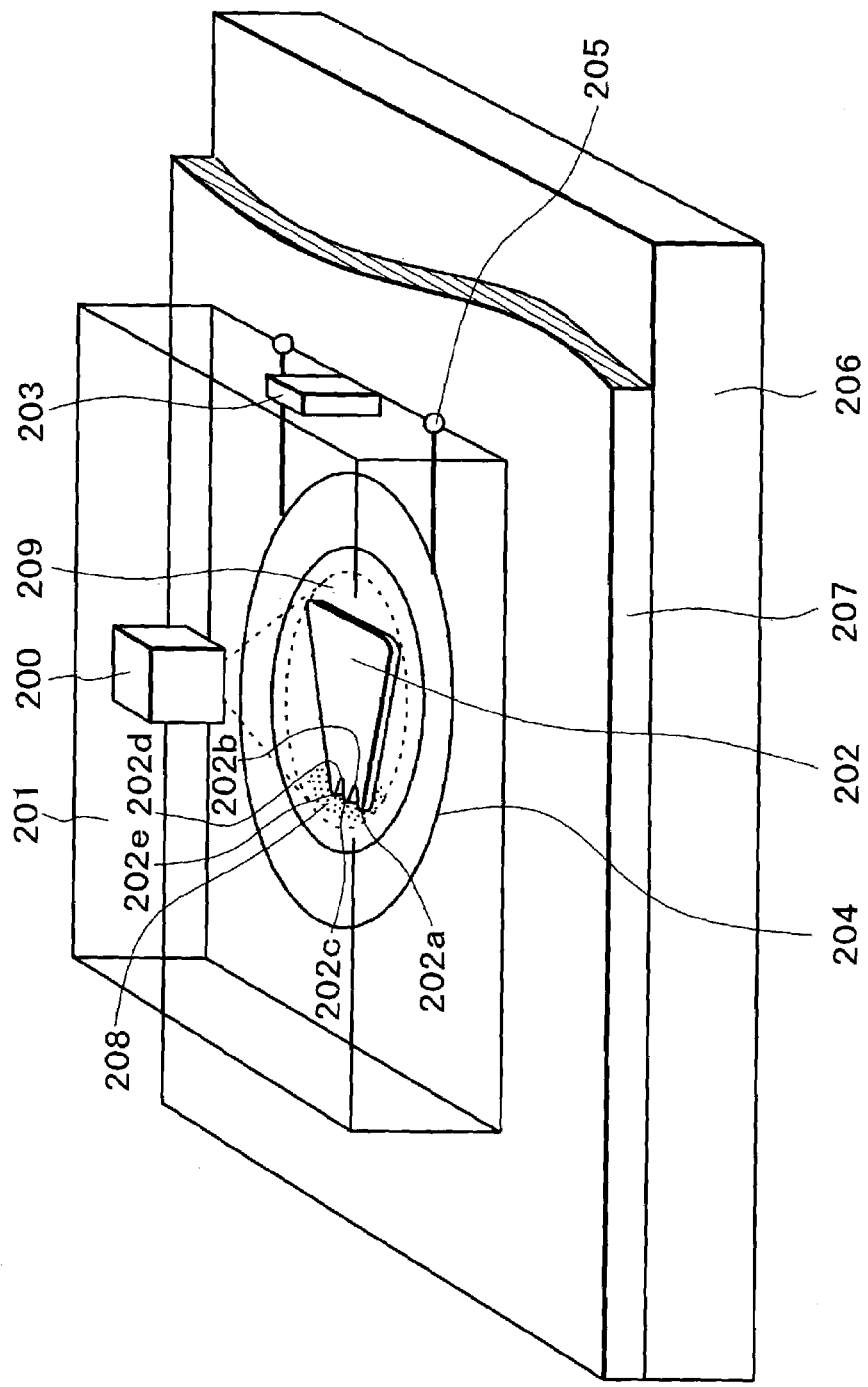
FIG. 2 is a view showing another preferred recording and reproducing head according to the present invention.

FIG. 2 is a view showing one of examples of the construction of the recording and reproducing head according to the present invention, wherein the metal scatterer 202 takes another preferred form. In this embodiment, the metal scatterer 202 comprises an Au thin film of a thickness of 20 nm in the shape of a heptagon, as viewed from the side of the semiconductor laser 200. The portion of the scatterer 202 at which intense near-field light 208, for exciting the recording film 207 optically or thermally is generated comprises five adjacent vertices, 202a, 202b, 202c, 202d and 202e, in the fringe of the metal scatterer 202. The three convex vertices, 202a, 202c and 202e, and two concave vertices, 202b and 202d, are arranged alternately. The radii of curvature of these vertices of scatterer 202 are set to about 20 nm.

Figure 3:
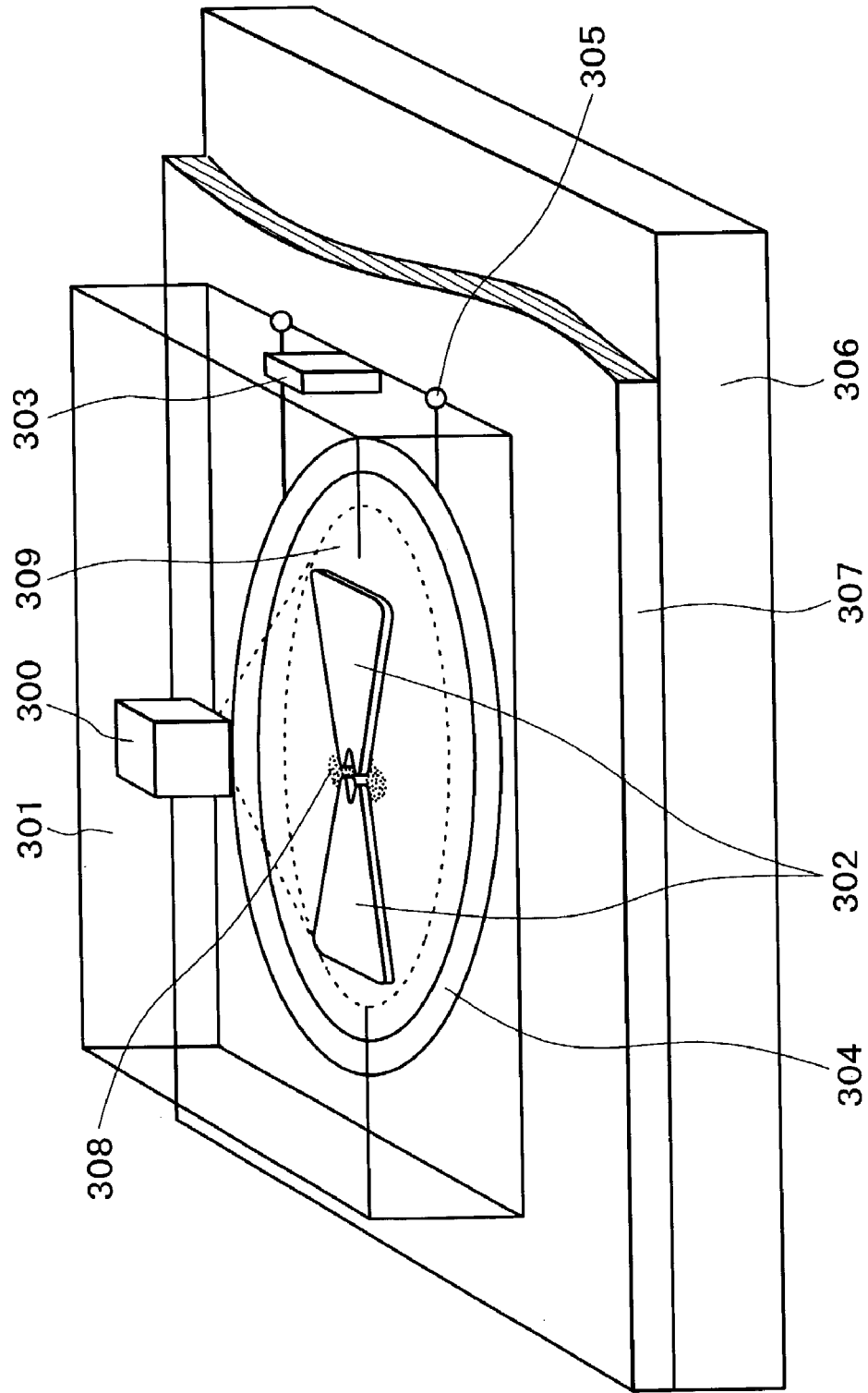
FIG. 3 is a view showing a further preferred recording and reproducing head according to the present invention.
Figure 4:
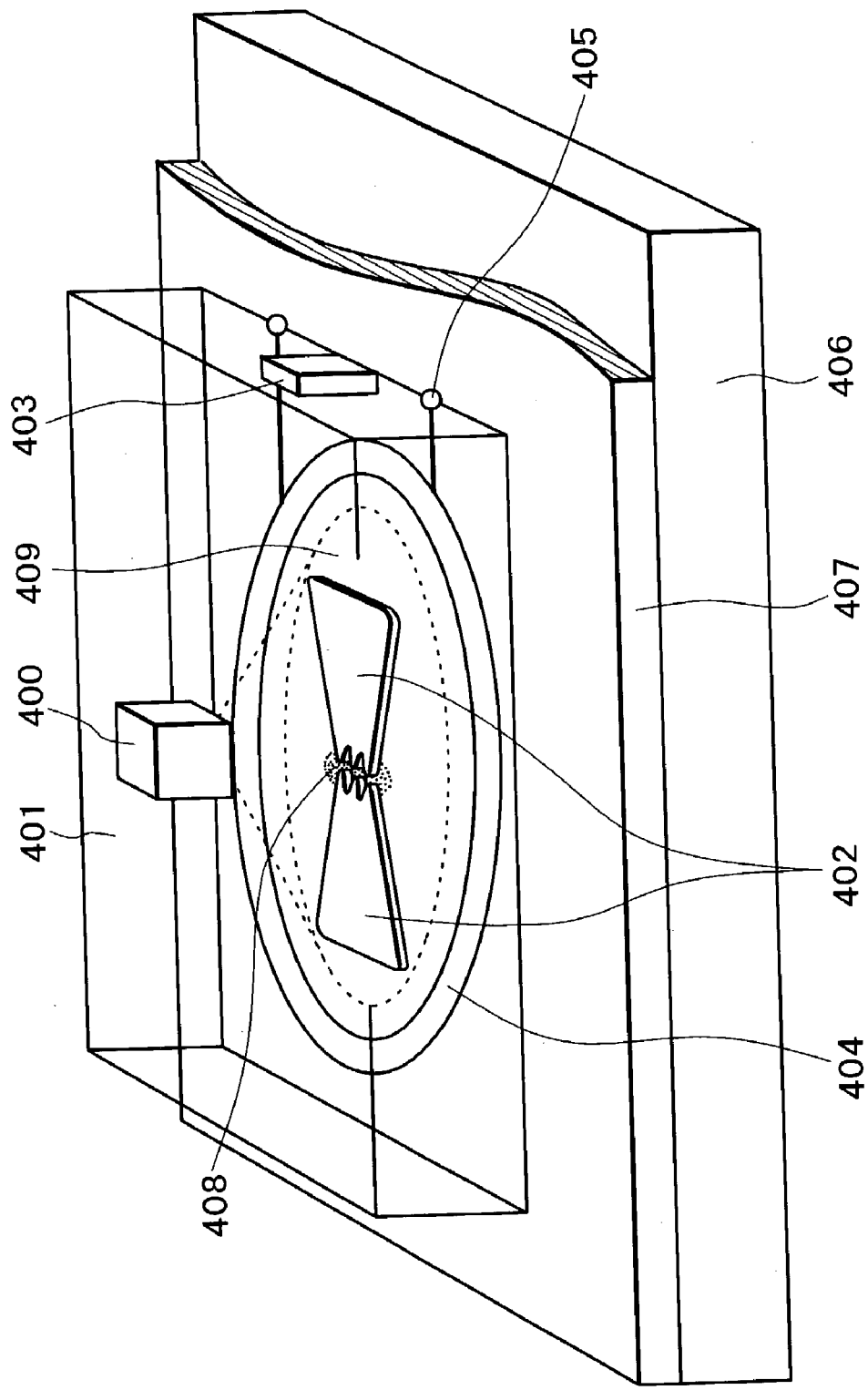
FIG. 4 is a view showing yet another preferred recording and reproducing head according to the present invention.

FIG. 3 and FIG. 4 are views each showing one of examples of the construction of the recording and reproducing head according to the present invention, wherein the metal scatterer takes further another arrangement and/or shape. FIG. 3 is a view showing the example in which the same metal scatterers as that in FIG. 1 are provided therein and are arranged with one set of vertex portions for generating near-field light 308 opposing the other set of vertex portions; FIG. 4 is a view showing the example in which the same metal scatterers as that in FIG. 2 are provided therein and are arranged with one set of vertex portions for generating near-field light 408 opposing the other set of vertex portions. In the preferred embodiments shown in FIGS. 3 and 4, the distance between the metal scatterers is 30 nm. It should be noted that in this description the metal scatterers whose shapes approximate a pentagon or heptagon are described by way of examples, but the shape of the scatterer shall be appropriately adjusted depending on the shape of a desired recorded mark (recorded magnetic domain), that is, a shape of a generation region of the near-field light that causes local physical properties to change by exciting the recording medium optically or thermally, and is not necessarily limited to polygons. Note also that the metal scatterer is not limited in material, size, thickness, etc. as long as the metal scatterer is capable of exciting plasmons inside the metal scatterer under application of the exciting light from the semiconductor laser as a light source. Similarly, although the semiconductor laser is a common single longitudinal-mode type device, the semiconductor laser is not particularly limited in optical output, emission wavelength, internal structure, etc. as long as the semiconductor laser is capable of exciting plasmons inside the metal scatterer to generate the intense near-field light in the vicinity of the metal scatterer. Further, although the recording head according to the present invention is one that can achieve better effects when being combined with the magnetic reproducing method in such a way that the magnetic-flux detecting means etc. are installed on the same slider and the like; the recording coil 104, the recording coil electrode 105, and the GMR element 103 are constituents required for an example of an embodiment that is specified for the thermomagnetic medium (necessity of these constituents will be described below). Therefore, none of these constituents has direct connection with a low-noise recording operation with the near-field light obtained with the metal scatterer according to the present invention.

FIG. 5 is a view illustrating the near-field light generated by the metal scatterer and how the recording medium is heated thereby in the recording and reproducing head according to the present invention. FIG. 5A is a view of geometries of the metal scatterer as viewed from the positive z-axis direction (from above in vertical direction off the sheet of the drawing) The metal scatterer is an Au thin film having a thickness of 30 nm in the z-axis direction and its peripheral part is composed of a combination of: a concave vertex of a radius of curvature of 15 nm, two convex vertices of radii of curvature of 25 nm that are adjacent to each other to sandwich the concave vertex, straight line segments connecting to these convex vertices, two convex part of radii of curvature of 25 nm, and a circular arc of a radius of curvature of 150 nm. The numerals in the figure indicate radii of curvature of the indicated portions of the perimeter of the metal scatterer. The angle that is formed by the straight line segments is 60 degrees and the length of the scatterer in the x-axis direction is 150 nm. Note that, in the explanatory examples of embodiments referring to FIGS. 1 to 4, the shapes of the metal scatterers are specified to be approximately polygons, respectively, but it is not necessarily an essential condition of the metal scatterer in the present invention that the peripheral part is composed exactly of a polygon, as shown in FIG. 5A.

FIG. 5B is the diagram showing results of a simulation of a near-field light distribution on the surface of the TbFeCo recording medium when the metal scatterer of FIG. 5A is placed 10 nm above the surface of the TbFeCo recording film of a thickness of 15 nm and the x-y plane is irradiated with a plane wave of a wavelength of 785 nm parallel. The solid lines in the figure are isointensity lines of the near-field light, a dashed line represent a fringe shape of the metal scatterer, and the numerals indicate the intensity ratio of the near-field light to incident light. By excitation of plasmons inside the metal scatterer caused by the irradiation of exciting light from the light source, the intense near-field light whose intensity is 200 times higher than the incident light is generated at two convex vertices pointing in the positive x-axis direction (facing to the right of the figure).

FIG. 5C is a diagram showing results of a simulation of a surface temperature distribution of the TbFeCo recording film under the foregoing conditions. It was assumed that the metal scatterer moved at a relative speed of 1 m/s in a positive x-axis direction to the TbFeCo recording film and that the light pulses of an irradiation duration time of 100 nsec were applied. The solid lines are isothermal lines, the dashed line represents a fringe shape of the metal scatterer, and each numeral shows a temperature rise from the room temperature. A shape of the recorded magnetic domain formed in the TbFeCo recording film by the thermomagnetic recording agrees mostly with the isothermal line at a predetermined recording temperature determined according to the recording film composition. Assuming that the recording temperature is room temperature plus 150° C., with the light pulse irradiation, a bean-shaped or approximately rectangular recorded magnetic domain (recorded mark) having the same shape as the isothermal line at the +150° C. is formed.

Figure 6:
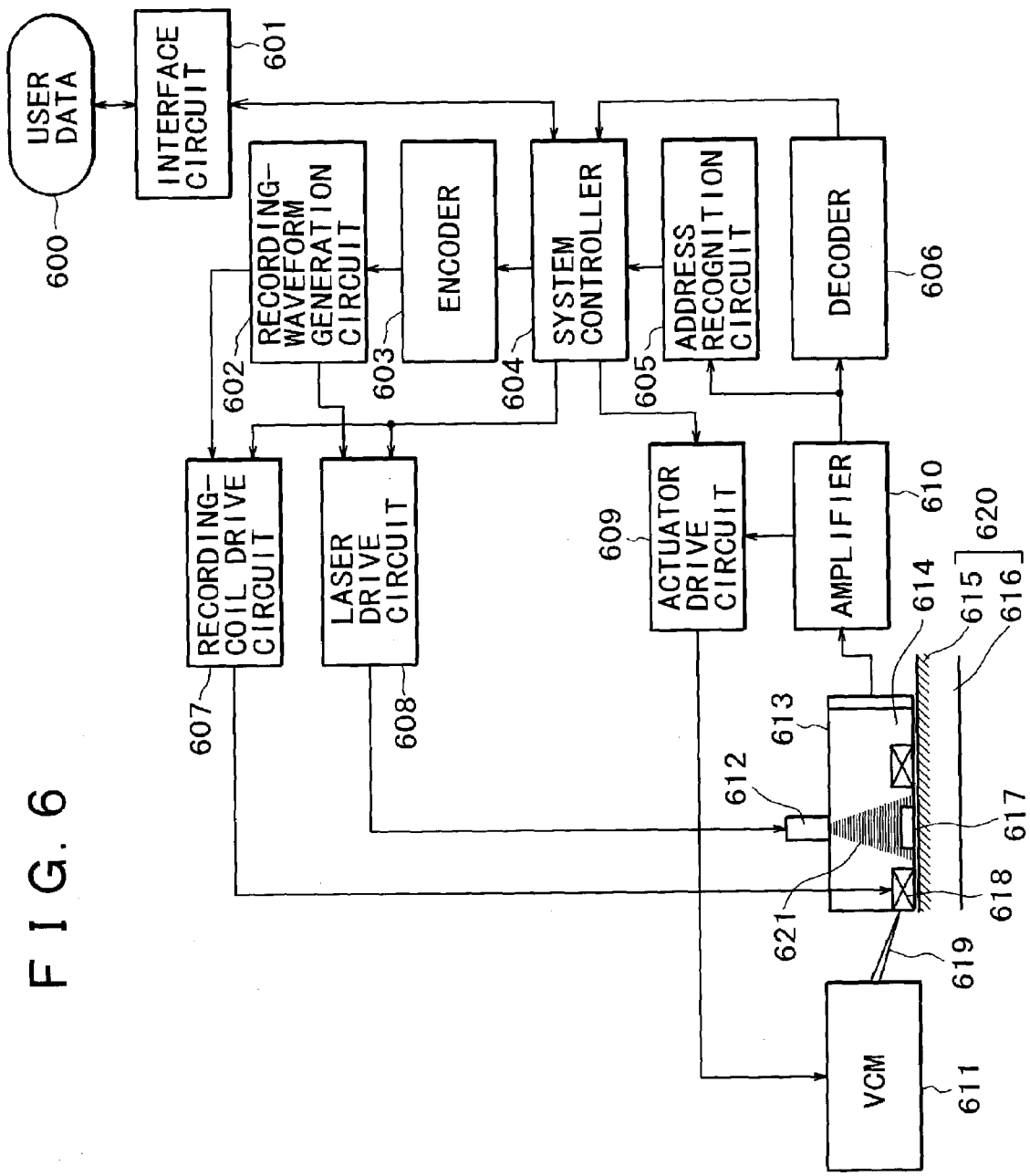
FIG. 6 is a view showing a preferred information recording and reproducing apparatus using the preferred recording and reproducing head of FIG. 1.

FIG. 6 is a view showing an example of the preferred construction of the information recording and reproducing apparatus that uses the preferred recording and reproducing head of the present invention shown in FIG. 1. First, acquisition of recording/reproducing position information that is done in parallel with a recording or reproducing operation is described below. That is, on a recording medium 620 consisting of a substrate 616 and a recording film 615 formed on the substrate 616, information that indicates a physical location on the recording medium 620 (address information) is recorded beforehand at the time of the manufacture as the magnetic domain array in which the information is indicated according to a fixed conversion rule. Therefore, when a GMR element 613 acting as the magnetic-flux detecting means is made to scan the surface of the recording medium 620, a signal that reflects the magnetic domain array in that surface, i.e., a signal indicating the address information, is outputted from the GMR element 613. This output signal of the GMR element 613 is amplified to a required level by an amplifier 610, and subsequently is inputted into a decoder 606, an actuator drive circuit 609, and an address recognition circuit 605. The address recognition circuit 605 analyzes a scanning position of the slider 614 from a signal sent from the GMR element 613, and transmits it to the system controller 604. According to position information of the GMR element 613 and a request for recording/reproducing from an external apparatus, the system controller 604 properly performs control of the actuator drive circuit 609, the recording-coil drive circuit 607, and the laser drive circuit 608. According to directions from the system controller 604 and signals from the GMR element 613, the actuator drive circuit 609 drives a VCM (Voice Coil Motor) 611 so that a metal scatterer 617 and the GMR element 613 may scan desired positions on the recording medium 620. In accordance with this driving signal, the VCM 611 moves the slider 614 that is fixed on the top of a gimbal arm 619 and places it in an arbitrary position on the recording medium 620. A semiconductor laser 612, the metal scatterer 617, the GMR element 613, and the recording coil 618 are installed on the slider 614, as described above.

At the time of recording information, user data 600 to be recorded is fed into the system controller 604 via an interface circuit 601 for an external apparatus, and is sent to an encoder 603 after error detection, addition to error correction information, etc., if needed. The encoder 603 puts the user data 600 through (1, 7) modulation, performs NRZT conversion on it, and thereby generates a signal that reflects the array of recorded magnetic domains on the recording medium 620. By referring to this signal, the recording-waveform generation circuit 602 generates both a control signal for the recording bias magnetic field and a control signal for the laser emission intensity. The recording coil drive circuit 607 receives directions from the system controller 604, drives the recording coil 618 according to the control signal for the recording bias magnetic field, and generates the recording bias magnetic field in a portion of the recording film 615 where the intense near-field light is generated by the metal scatterer 617. Further, the laser drive circuit 608 also receives directions from the system controller 604, and according to a control signal for the laser emission intensity, drives the semiconductor laser 612 serving as the recording energy source. Laser beam 621 emitted from the semiconductor laser 612 is applied on the metal scatterer 617; and the metal scatterer 617 generates the intense near-field light in the vicinity that is determined by the shape of the metal scatterer 617, and heats the recording film 615 therewith. Here, it is assumed that the heated region by the near-field light is wider than a region where the recording bias magnetic field is applied by the recording coil 618. The recording film 615 is the perpendicular magnetic recording film having an easy axis in a direction normal to the film surface (for example, a TbFeCo amorphous alloy film, a Pt/Co multilayer, etc.), whose coercive force at normal temperatures is higher than the recording bias magnetic field applied externally, and whose coercive force at the time of recording, being heated by the laser beam, is lower than the recording bias magnetic field. Adopting this configuration makes it possible to form a desired recorded magnetic domain on the recording film 615 by controlling the heating by the laser beam and the recording bias magnetic field, as described below.

At the time of reproducing the information, the surface of the recording film 615 is scanned with the GMR element 613, and a signal that reflects the array of recorded magnetic domains is generated. The output signal of the GMR element 613 that reflects the array of recorded magnetic domains is amplified to a required level by the amplifier 610, and subsequently is inputted into the actuator drive circuit 609, the decoder 606, and the address recognition circuit 605. The decoder 606 restores the recording data by performing a transformation that is inverse to the transformation by the encoder 603, and transmits a restored result to the system controller 604. The system controller 604 conducts such processing as error detection, error correction, etc., if needed, and sends out the reproduced user data 600 to an external apparatus via the interface circuit 601.

Incidentally, in this description, examples of constructions of the information recording and reproducing apparatus using a preferred recording and reproducing head according to the present invention, as shown in FIGS. 2–4, will not be shown particularly, but it may be understood that the examples of constructions for these recording and reproducing apparatus are ones in which the recording and reproducing head part of FIG. 6 is appropriately replaced with any of such recording and reproducing heads.

Figure 8:
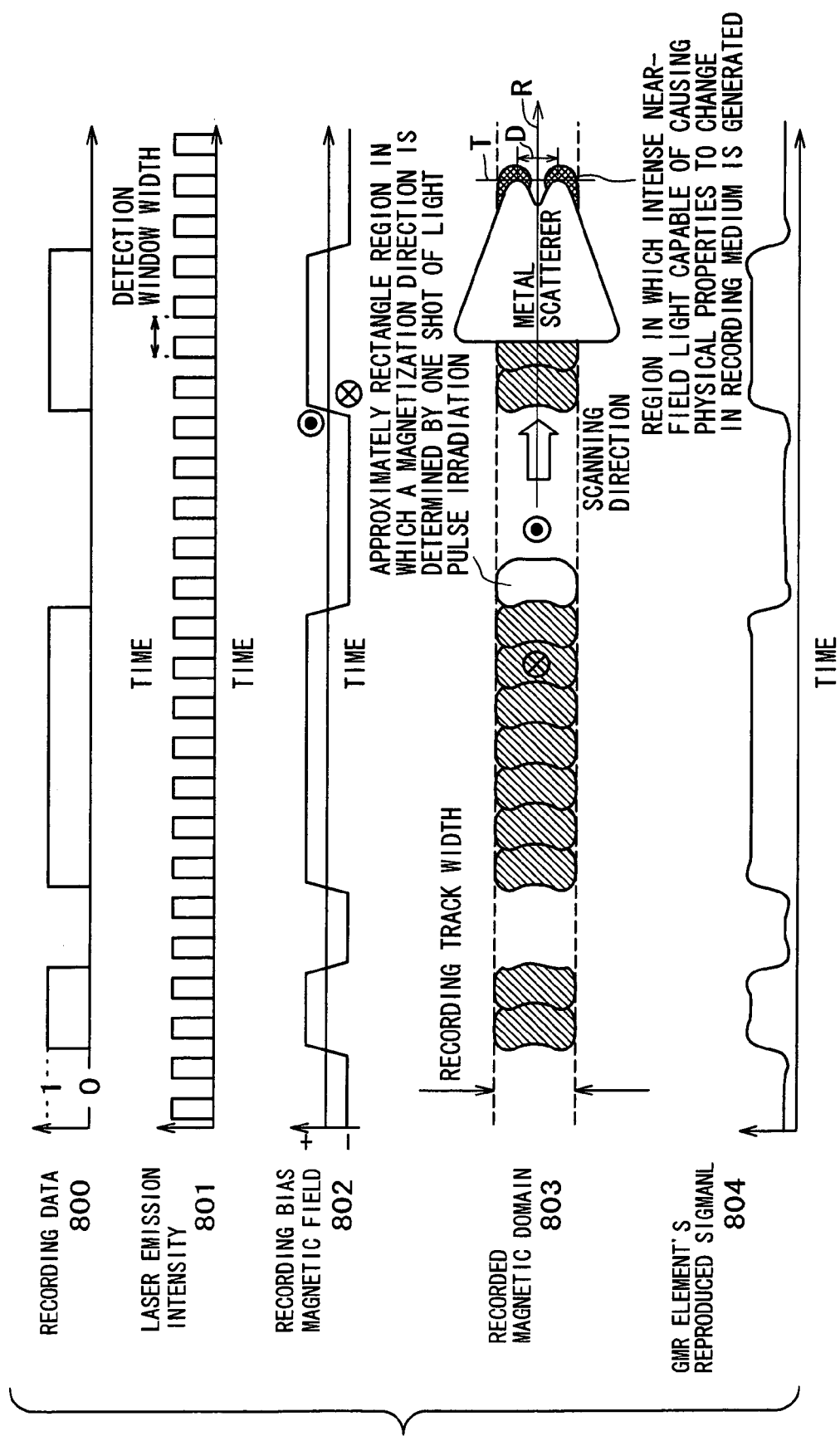
FIG. 8 is a view illustrating an example of operation of the preferred information recording and reproducing apparatus of FIG. 6.

FIG. 8 is a view illustrating in detail an example of operation of a preferred information recording and reproducing apparatus of the present invention, as shown in FIG. 6. It is assumed herein that the user data 600 has been transformed by the encoder 603 at the time of recording, and recording data 800 has been obtained. The recording data 800 is sent to the recording-coil drive circuit 607 via the recording-waveform generation circuit 602, and generates a recording bias magnetic field 802 in the vicinity of the heated position by the intense near-field light on the recording film 615. This recording bias magnetic field 802 is applied normal to the recording film 615. Simultaneously, the laser drive circuit 608 drives the semiconductor laser 612 in a pulsed manner, as shown by the diagram of laser emission intensity 801, in synchronization with minimum change units (detection window width) of the recorded magnetic domain length along the recording track. In the region heated by the intense near-field light, the coercive force of the recording film 615 is reduced to lower than an absolute value of the recording bias magnetic field, and the magnetization of that region flows in a direction of the recording bias magnetic field. Thus, one shot of the light pulse irradiation determines the magnetization direction in a bean-shaped or approximately rectangular region as shown by the diagram of a recorded magnetic domain 803. With the metal scatterer scanning over the recording film 615, the center of the heated region is moved at certain intervals, and consequently the recording film is heated for that region and cooled intermittently. If the interval of the light pulse irradiation is being shortened, the bean-shaped or approximately rectangular regions come to overlap each other partially, and the recording is performed as if an elongated, bean-shaped or approximately rectangular recorded magnetic domain were formed by each shot of the light pulse irradiation.

Figure 7:
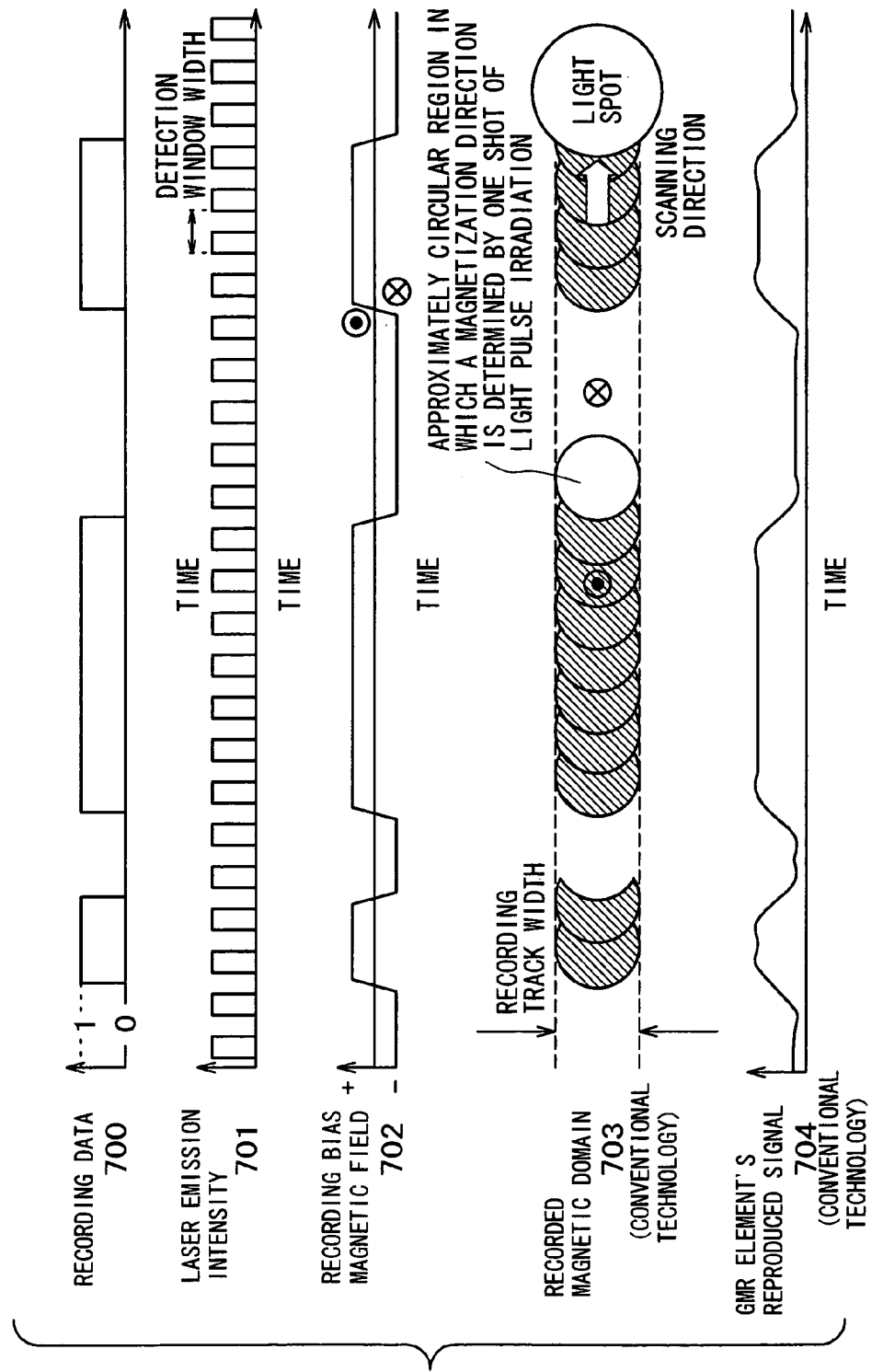
FIG. 7 is a view illustrating in detail an example of a recording process in which the light pulse magnetic-field modulation recording is performed on the perpendicular magnetic recording film using a conventional recording and reproducing head that uses a light spot of a single peak.

The diagram of the recorded magnetic domain 803 in FIG. 8 shows schematically the shape of this recorded magnetic domain, as viewed from directly above the recording film 615, that is formed on the recording film 615 when performing a recording operation in such a way as illustrated by diagrams of the laser emission intensity 801 and the recording bias magnetic field 802. As shown in FIG. 8, a bean-shaped or approximately rectangular recorded magnetic domain 803 has a shape such that a side in a direction perpendicular to the track direction is longer than a side in the track direction. Note here that a line connecting the domain wall near the track center and the domain wall near the track edge of the bean-shaped recorded magnetic domain 803 is approximately perpendicular to the track direction. In FIG. 8, the near-field light generation region (slider) is made to scan from the left to the right. When the recording bias magnetic field is positive, a magnetic domain whose magnetization directs upwards off the sheet of the drawing (meshed domain) is formed; when the recording bias magnetic field is negative, a magnetic domain whose magnetization directs downwards off the sheet of the drawing (colorless domain) is formed. In the recording that uses a preferred recording and reproducing head according of the present invention, since a generation region of the intense near-field light is a row of plural near-field light sources, curvature of the isothermal line at the time of recording in the recording film in the track center region can be made small (average radius of curvature being made large) as compared with a case where the recording and reproducing head with the single-peaked light spot previously mentioned is used. At the time of, reproducing the information, the GMR element 613 is made to scan over the recording medium 620, and the reproduced signal is obtained. The reproduced signal reflects the recording data 800 obtained by transformation of the user data 600 in the encoder 603, and is restored to the user data 600 after being subjected to such processing as amplification, equalization, binary conversion, decoding, etc., if needed. The diagram of a GMR reproduced signal 804 shows the reproduced signal waveform obtained when the magnetic domain 803 is magnetically-reproduced by use of the GMR element 813. The recording according to the present invention has a feature that the bend of the recorded magnetic domain in the middle of the track is small as compared with the recording by the conventional technology previously described referring to FIG. 7. Consequently, edges of the GMR reproduced signal 804 show steep build-up and steep falling as compared with the edges of the GMR reproduced signal 704. That is, as compared with the GMR reproduced signal 704, the GMR reproduced signal 804 has high resolution, and thereby becomes extremely advantageous in several respects: the size of the information recording and reproducing apparatus, the reliability of the information recording and reproducing apparatus, etc. In addition, the amount of track offset that is allowed between the time of recording and the time of reproducing is mitigated because a large decrease in the resolution does not occur even when the center of the GMR element is offset from the center of the recording track. Further, less noise is generated, even at the time of high-density recording because the domain walls do not get too close to each other on both edges of the track. Therefore, the present invention is extremely advantageous in the size of the information recording and reproducing apparatus, its reduced manufacturing cost, and high reliability.

Since the present invention aims at reducing the curvature of the isothermal line at the time of recording in the track center region of the recording film to as small a value as possible, necessarily, it is preferable that the scanning direction of the recording and reproducing head to the recording medium, i.e., the direction of the recording track R, is largely perpendicular to the line T tangent to the convex vertices of the scatterer where the intense near-field light capable of causing the physical properties to change in the recording medium is generated, as is shown in the schematic diagram of the metal scatterer in the recorded magnetic domain 803 in FIG. 8. Further, in this case, since the width of the recording track is equal to the width of the magnetic domain that is apparently formed for each shot of the light pulse irradiation, the distance, D, between the vertices of the scatterer at which the intense near-field light capable of causing the physical properties to change in the recording medium becomes necessarily shorter than the width of this recording track.

According to the present invention, in the recording head, the recording and reproducing head, and the information recording and reproducing apparatus, all of which use the recording medium that stores information by means of a local change in the physical properties caused by being subjected to optical or thermal excitation, increase in the recording noise that accompanies malformation of a minute recorded mark structure can be suppressed. In addition, since the shape of the recorded mark in the recording track center region can be controlled to match reproducing characteristics of a reproduced-signal detecting element, it also becomes possible to enhance the capability of reproducing information from the recording medium. With the forgoing capabilities, the present invention makes possible the following features: (1) to improve the recording density without using the reproduced-signal detecting element that is extremely hard to manufacture etc., (2) to prevent the increase in the size of the information recording and reproducing apparatus and the increase in the manufacturing cost of the information recording and reproducing apparatus, and at the same time (3) to realize high reliability.

The foregoing invention has been described in terms of preferred embodiments. However, those skilled, in the art will recognize that many variations of such embodiments exist. Such variations are intended to be within the scope of the present invention and the appended claims.

Nothing in the above description is meant to limit the present invention to any specific materials, geometry, or orientation of elements. Many part/orientation substitutions are contemplated within the scope of the present invention and will be apparent to those skilled in the art. The embodiments described herein were presented by way of example only and should not be used to limit the scope of the invention.

Although the invention has been described in terms of particular embodiments in an application, one of ordinary skill in the art, in light of the teachings herein, can generate additional embodiments and modifications without departing from the spirit of, or exceeding the scope of, the claimed invention. Accordingly, it is understood that the drawings and the descriptions herein are proffered by way of example only to facilitate comprehension of the invention and should not be construed to limit the scope thereof.

Our invention also includes the following method.

1. An information recording method comprising the steps of:

encoding user data to obtain recording data;

sending the recording data to a recording-coil drive circuit via a recording waveform generation circuit, and generating a recording bias magnetic field in the vicinity of a heated region on an information recording medium using intense near-field light from a scatterer disposed between a semiconductor laser and said information recording medium;

applying the recording bias magnetic field perpendicular to the recording medium, and simultaneously driving, via a laser drive circuit, said semiconductor laser in a pulsed manner in synchronization with minimum change units of a recorded magnetic domain length along a recording track;

reducing the coercive force of the recording medium to lower than an absolute value of the recording bias magnetic field in the region heated by the near field light so that the magnetization of the region follows a direction of the recording bias magnetic field whereby one shot of a light pulse irradiation determines a magnetization direction in said region having an approximately rectangular shape;

moving the center of the heated region at predetermined intervals by moving the scatterer over the recording track so that a plurality of said regions in the recording medium are heated and cooled intermittently; and shortening the light pulses so that the approximately rectangular regions partially overlap each other to form an elongated, approximately rectangular recorded magnetic domain.

2. The information recording method of above 1 wherein said scatterer has a perimeter defining a plurality of vertices and a distance between a first vertex and a last vertex of said plurality of vertices is shorter than a width of said recording track.

What is claimed is:

1. An information recording and reproducing head comprising:

a light source; and a first scatterer for recording information on a recording medium by generating near-field light by irradiation of the recording medium with light from said light source and forming a magnetic domain array on the recording medium, wherein a perimeter of said scatterer defines a plurality of vertices and a distance between a first vertex and a last vertex of said plurality of vertices is shorter than a recording track width on said recording medium, and the near-field light is generated at each of the plurality of vertices.

2. The information recording and reproducing head according to claim 1 wherein said plurality of vertices comprises first and second convex vertices wherein said distance is measured between said first and second vertices.

3. The information recording and reproducing head according to claim 1 wherein said plurality of vertices comprises first, second and third convex vertices wherein said distance is measured between said first and third vertices.

4. The information recording and reproducing head according to claim 1, further comprising a magnetic flux detecting element for detecting leakage flux from a surface of said recording medium.

5. The information recording and reproducing head according to claim 1 further comprising a second scatterer identical to said first scatterer wherein the vertices of said first and second scatterers are disposed in a face-to-face relationship.

6. The information recording and reproducing head according to claim 1, wherein a line tangent to each of said plurality of vertices is approximately perpendicular to a recording track direction.

7. The information recording and reproducing head according to claim 1, wherein said scatterer is formed of Au.

8. The information recording and reproducing head according to claim 1 further comprising a recording coil for generating a magnetic field in the vicinity of said plurality of vertices.

9. The information recording and reproducing head according to claim 2 wherein said perimeter defines a concave vertex disposed between said first and second convex vertices.

10. The information recording and reproducing head according to claim 3 wherein said perimeter defines a first concave vertex disposed between said first and second convex vertices and a second concave vertex disposed between said second and third convex vertices.

11. The information recording and reproducing head according to claim 5 wherein said first and second scatterers are formed of Au.

12. The information recording and reproducing apparatus according to claim 1 further comprising:

a slider on which said scatterer is disposed; and a scanning mechanism for moving said slider in relation to said recording medium.

13. An information recording and reproducing apparatus comprising:

a light source;

a first scatterer for recording information on a recording medium by generating near-field light by irradiation of the recording medium with light from said light source and forming a magnetic domain array on the recording medium, wherein a perimeter of said scatterer defines a plurality of vertices and a distance between a first vertex and a last vertex of said plurality of vertices is shorter than a recording track width on said recording medium, and the near-field light is generated at each of the plurality of vertices;

a magnetic flux detecting element for detecting leakage flux from a surface of said recording medium;

an encoder for performing a first transformation of said information;

recording-signal processing means that drives said light source according to said first transformation and forms a magnetic domain array corresponding to said information on said recording medium; and reproduced-signal processing means for restoring said information by performing an inverse transformation, which is inverse to said first transformation, on a signal from said magnetic-flux detecting means.

14. The information recording and reproducing apparatus according to claim 13, further comprising:

a slider on which said scatterer is disposed; and a scanning mechanism for moving said slider in relation to said recording medium.

15. The information recording and reproducing head according to claim 13 wherein a line tangent to each of said plurality of vertices is approximately perpendicular to a recording track direction.

16. The information recording and reproducing head according to claim 13, further comprising;

a second scatterer identical to said first scatterer wherein the vertices of said first and second scatterers are disposed in a face-to-face relationship.

* * * * *